July 3, 1956  E. A. DIETZ  2,753,026
FRICTION-TYPE DRIVE AND BRAKE MECHANISMS
Filed Nov. 12, 1952
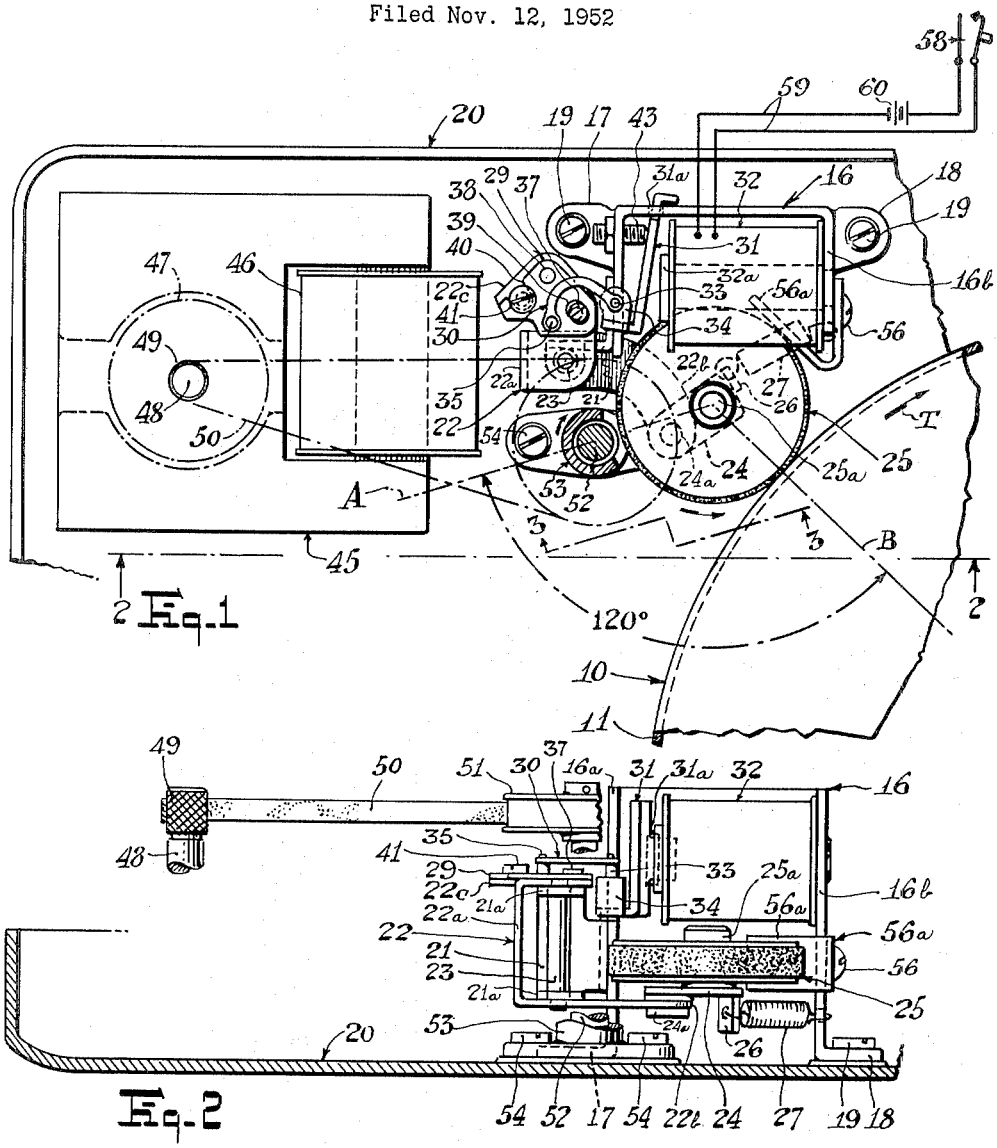
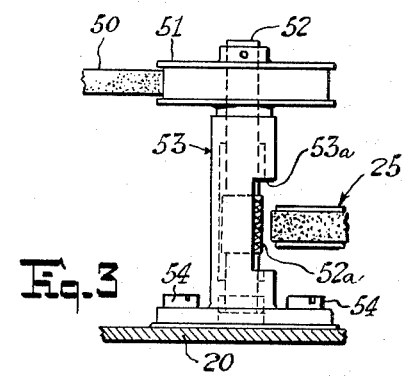
INVENTOR
Edward A. Dietz
BY
George H. Fritzinger

United States Patent Office

2,753,026
Patented July 3, 1956

2,753,026

FRICTION-TYPE DRIVE AND BRAKE MECHANISMS

Edward A. Dietz, Westfield, N. J., assignor to Thomas A. Edison, Incorporated, West Orange, N. J., a corporation of New Jersey Application November 12, 1952, Serial No. 319,825

8 Claims. (Cl. 192—4)

This invention relates to friction-type drive and brake mechanisms for phonographs and similar machines, and more particularly it relates to a combined form of friction-type drive and brake mechanism for dictating and transcribing machines adapted especially to enable quick starting and stopping of rotational movement of the record supports of such machines.

Friction-type drives for phonographs usually employ an idler wheel interposed between the drive and driven members. In machines using disc records, the driven member is typically some standard form of turntable. As far as is known, it is the general practice to move the idler wheel out of engagement with the turntable when record rotation is stopped. In accordance with the present invention, however, the idler wheel is retained yieldably in constant frictional engagement with the turntable at all times. This is done not only to simplify the mechanism and to obtain a smooth starting and stopping action with minimum wear and tear on the moving parts but also, in particular, so that the idler wheel may be utilized in co-operation with a stationary brake shoe to stop the turntable immediately after the drive connection to the turntable is broken. In recording dictation, quick stopping of the record is important to conserve record space particularly because the usual dictator stops frequently during the course of dictating to develop the train of his thoughts; and in transcribing dictation, quick stopping is equally important to prevent trailing off and loss of words each time the transcribing machine is stopped to enable the portion last reproduced to be typed. By retaining the idler wheel in constant engagement with the turntable, starting and stopping of record rotation is accomplished simply by shifting the idler wheel along the rim of the turntable between the rotating driving member and the stationary brake shoe.

It is accordingly an object of my invention to provide improved drive and brake mechanisms especially adapted for machines which are started and stopped frequently in the normal use thereof.

It is another object to provide a simple and smoothly-acting drive and brake mechanism for dictating machines or the like.

It is another object to provide a combined friction-type drive and brake mechanism for dictating machines or the like, which is adapted to enable the driven member not only to be started quickly but also to be stopped quickly immediately after driving power is removed.

A still further object is to provide an improved form of combined drive and brake mechanism which is operable positively into start and stop positions by remote control, which is smoothly-acting to reduce wear and tear on movable parts, and which is easily adjustable to enable driving pressure of the idler wheel against the driving wheel to be set within limits.

These and other objects and features of my invention will be apparent from the following description and the appended claims.

In the description of my invention reference is had to the accompanying drawings, of which:

Figure 1 is a plan view of a combined drive and brake mechanism for the turntable of a dictating machine, illustrating my invention;

Figure 2 is an elevational view of the mechanism shown in Figure 1, as seen from the line 2—2 of that figure, with certain parts broken away and other parts omitted; and Figure 3 is a detailed view showing the driving spindle and associated parts as seen from the line 3—3 of Figure 1.

By way of preferred illustrative example, the invention is herein shown and described as a drive and brake for a phonograph turntable 10 having a peripheral rim 11. The turntable is rotatably supported at its central axis and is herein only fractionally shown. The drive per se includes a bracket 16 U-shaped as viewed from the top, which has oppositely directed side lugs 17 and 18 secured by screws 19 to the base of a frame or housing member 20 fractionally shown, it being understood that the journal (not shown) for the turntable is also secured to this housing member. Secured to the lefthand side 16a of the bracket 16 about midway the height thereof is a smaller bracket 21 having upper and lower turned-over lugs 21a. A lever 22 has a bail portion 22a straddling the bracket 21 from top to bottom pivotally secured to the lugs 21a by a pin 23 on an axis parallel to that of the turntable; also, this lever has a curved arm 22b which extends from the lower portion thereof towards the turntable but terminates short thereof. Pivoted at 24a to the end of the arm 22b is a link 24 and secured to an end portion of this link is a journal stud 25a on which is journaled a friction-type rubber-tired idler wheel 25, the pivot axes of the link 24 to the arm 22b and the journal axis of the idler wheel 25 to the link being both parallel also to the journal axis of the turntable. Thus, the idler wheel 25 has freedom of movement along the rim of the turntable by pivotal movement of the lever 22 about the pin 23 and has also freedom of movement towards and away from the turntable by pivotal movement of the link 24 about the pivot 24a. A tension spring 27, which is connected between a lug 26 on the end of the link 24 and the right side 16b of the bracket 16, is directed so as to urge the idler wheel yieldably against the rim of the turntable and at the same time urge the idler wheel along the rim 11 in the direction of rotation thereof, indicated by the arrow T, against a brake shoe 56a secured by screws 56 to the right side 16b of the bracket 16.

The upper portion of the lever 22 has a short rearwardly-extending arm 22c which is coupled to an armature 31 pivoted at 31a to the back side of the bracket 16 and actuatable by an electromagnet 32 disposed within the U-bracket 16 and secured to the right wall 16b thereof. The coupling connection comprises a plate 29 pivoted at 38 to the arm 22c for angular adjustment relative thereto, and a curved link 30 pivotally connected at 33 to a lug 34 of the armature and at 35 to the plate 29. Fine adjustment of the plate 29 about the pivot 38 is effected by means of a screw 37 in the arm 22c having an eccentric head engaging a slot 39 in the plate, and locking of the plate in adjusted position is effected by means of a headed screw 41 in the arm 22c having a shank passing through a clearance slot 40 of the plate, it being understood that the locking screw 41 is loosened whenever the plate is to be adjusted and is then screwed inwardly to tighten the head against the portion of the plate surrounding the slot. An adjustable stop 43 on the bracket 16 for the armature 31 is so set that the spring link 30 is in an unstrained condition while the electromagnet is not actuated.

A drive spindle 52 is journaled parallel to the axis of the turntable in a bearing 53 secured at its lower end by screws 54 to the base of the housing member 20. The bearing is cut away at 53a (Figure 3) to expose a knurled portion 52a of the spindle for frictional engagement with the idler wheel 25. The knurling is such that the drive portion 52a is merely indented for suction grip with the peripheral rubber tire of the idler wheel 25 wherefore to minimize slippage and reduce wear of the peripheral tire. The spindle is driven clockwise (Figure 1) as by an A.-C. motor 45 having a stator including a winding 46, and a rotor 47 mounted on a shaft 48. The shaft carries a driving pulley 49 coupled as by a belt 50 to a pulley 51 pinned to the upper end of the drive spindle.

Upon energization of the electromagnet, as through a circuit 59 from a potential source 60 upon closure of a switch 58, the armature 31 is drawn inwardly to move the idler wheel a short distance along the rim of the turntable against the resisting force of the tension spring 27 into frictional engagement with the knurled portion 52a of the driving spindle. The armature has some excess movement which is taken up by the yieldable curved link 30 to cause the idler wheel to engage the driving spindle under definite pressure. Preferably, the link 30 is made of thin flat stock of resilient metal such as beryllium copper. Such form of spring is cheaply produced within small tolerance limits. The pressure of the idler wheel against the driving spindle is set finally within close limits by adjustment of the plate 29 on the arm 22a in the manner abovedescribed. For example, when the idler wheel engages the driving spindle, the former is turned counterclockwise to transmit clockwise motion to the turntable in the direction of the arrow T. The motion of the idler wheel away from the brake shoe 56a into frictional engagement with the driving spindle 52a is very small. Thus, almost immediately upon opening the circuit of the electromagnet 32, the idler wheel is propelled by the spring 27 against the brake shoe 56a not only to remove the driving power from the turntable but to stop the turntable quickly from any coasting movement. This utilization of the idler wheel as a component of the drive mechanism while the electromagnet is energized and as a component of a braking mechanism when the electromagnet is not energized enables substantial simplification of mechanism and positive assurance of proper synchronization of the driving and braking means.

In order that the frictional grip between the driving spindle 52a and the idler wheel 25, as well as between the idler wheel and the turntable 10, may be positive to prevent slippage between these parts for quick starting of the turntable, the spindle is positioned on a radius line A of the idler wheel which is at an oblique angle to the radius line B through the center of the turntable. Typically, an angle of about 120° is preferred. When the components are at such angle, a driving component of force of the spindle 52a on the idler wheel is in a direction tending to wedge the idle wheel between the spindle and turntable. Since this component will increase with increased load resistance of the turntable, the frictional grip between the driving components is varied with the load to cause the turntable to be driven positively without slippage of parts. Such avoidance of slippage preserves the rubber tire of the idler wheel 25 to increase its wear resistance.

The point of engagement of the idler wheel 25 with the brake shoe 56a is however preferably on a radius line at about 90° with the radius line B aforementioned so that wedging of the idler wheel between the turntable and brake shoe is prevented. If wedging were allowed to occur between the turntable and brake shoe, the idler wheel would rebound because it is held only yieldably by the tension spring 27 when engagement of the idler wheel with the brake shoe occurs. Notwithstanding that the points of engagement of the brake shoe and turntable with the idler wheel are at radius lines of about 90° apart, the turntable is stopped very quickly and without undesirable rebound when the energizing current to the electromagnet is cut off.

The preferred embodiment of my invention hereinabove particularly shown and described is intended to be illustrative and not limitative of my invention since the same is subject to many changes and modifications without departure from the scope of my invention, which I endeavor to express according to the following claims.

I claim:

1. A friction-type drive mechanism comprising driving and driven wheels and an intercoupling friction-type idler wheel all having parallel journal axes; means mounting said idler wheel for one freedom of movement towards said driven wheel and for another freedom of movement along a periphery of the latter into and out of frictional engagement with said driving wheel; means for moving said idler wheel along said periphery; and biasing means effective on said idler wheel to maintain the same continually in frictional driving engagement with said periphery as the idler wheel is moved into and out of frictional engagement with said driving wheel.

2. A friction-type drive mechanism comprising driving and driven wheels and an intercoupling friction-type idler wheel all having parallel journal axes; means mounting said idler wheel for one freedom of movement towards said driven wheel and for another freedom of movement along a periphery of the latter into and out of frictional engagement with said driving wheel; biasing means acting on said idler wheel in a direction to cause the same to be held yieldably in frictional engagement with the periphery of said driven wheel and to be urged along said periphery into a position wherein the idler wheel is disengaged from said driving wheel; and means operable while said idler wheel is held by said biasing means in frictional engagement with said driven wheel to move said idler wheel along said periphery into frictional engagement with said driving wheel.

3. A friction-type driving mechanism comprising driving and driven wheels on fixed parallel journal axes; an intercoupling friction-type idler wheel; a journal bearing for said idler wheel; a universal mounting for said journal bearing enabling movement of said idler wheel in directions towards and away from the periphery of said driven wheel and in directions along said periphery into and out of engagement with said driving wheel; means for stopping said idler wheel in a direction of movement thereof along said periphery away from said driving wheel; biasing means connected to said journal bearing and urging said idler wheel out of contact with said driving wheel and in continuous frictional engagement with said driven wheel; and means operable to move said idler wheel into frictional engagement with said driving wheel while the same is retained by said biasing means in frictional engagement with said driven wheel.

4. A combined friction-type drive and brake mechanism comprising a driven wheel and a driving wheel having substantially parallel journal axes; an intercoupling friction-type idler wheel universally mounted for freedom of movement substantially normal to the periphery of said driven wheel and for movement along said periphery into and out of frictional engagement with said driving wheel, said idler wheel being biased into engagement with said periphery; a stationary brake shoe in close proximity with the side of said idler wheel opposite said driving wheel; and means effective while said idler wheel is continually in frictional engagement with said driven wheel for moving said idler wheel back and forth alternately into frictional engagement with said driving wheel and brake shoe whereby to start and stop rotational movement of said driven wheel.

5. A combined friction-type drive and brake mechanism, comprising a driving wheel; a driven wheel; and a friction-type idler wheel for intercoupling said driving wheel and driven wheel; a stationary brake shoe in proximity with the side of said idler wheel opposite said driving wheel; means mounting said idler wheel for freedom of movement towards and away from said driven wheel and for limited movement along said driven wheel between said driving wheel and said brake shoe; biasing means holding said idler wheel normally in frictional engagement with said driven wheel and brake shoe whereby said driven wheel is normally braked against rotational movement; and means operable while said idler wheel is retained constantly in frictional engagement with said driven wheel by said biasing means to move said idler wheel out of contact with said brake shoe and into frictional engagement with said driving wheel wherefore to release said driven wheel for rotational movement and to couple the same to said driving wheel in the sequence here named.

6. In a drive mechanism for a phonograph turntable or the like including a driving wheel located at a distance from a rim of said turntable: the combination of a movable support; a friction-type idler wheel swingingly mounted on said support; means for urging said support and said idler wheel to unoperated positions wherein said support is at one limit of its movement and said idler wheel is held under pressure in frictional engagement with said rim at a distance from said driving wheel; actuatable means having a definite length of travel; and a yieldable means connecting said actuatable means to said support and placed under strain upon full operation of said actuatable means to cause said idler wheel to engage said driving wheel under definite pressure.

7. In a drive mechanism for a phonograph turntable or the like including a driving wheel located at a distance from a rim of said turntable: the combination of a universal mounting including a movable support and a member pivoted thereto; an idler wheel journaled on said pivoted member; spring means urging said pivoted member so as to hold said support in unoperated position and said idler wheel in frictional engagement with said rim; an electromagnetic device including an armature having a definite length of travel; a connection including resilient means between said armature and said support; and means to energize said electromagnetic device to effect a full-stroke movement of said armature to cause said support to be urged into an operated position wherein said idler wheel is pressed with definite pressure against said driving wheel and is concurrently held in frictional engagement with said rim by said spring means.

8. The combination set forth in claim 7 wherein said connection between said armature and said support includes adjustable means to set the amount of straining of said resilient means and the pressure of said idler wheel against said driving wheel when said armature is in fully actuated position.

References Cited in the file of this patent

UNITED STATES PATENTS

| | | |
|---|---|---|
| 1,035,442 | Howard | Aug. 13, 1912 |
| 2,181,318 | Fessenden | Nov. 28, 1939 |
| 2,528,061 | Knapp | Oct. 31, 1950 |
| 2,626,528 | Keller | Jan. 27, 1953 |